(12) United States Patent  
Joplin (10) Patent No.: US 7,261,312 B1  
(45) Date of Patent: Aug. 28, 2007

(54) TRAILER STABILIZATION AND WEIGHT DISTRIBUTION DEVICE

(76) Inventor: Benjamin P. Joplin, 4430 Leasure Dr., Mt. Hood / Parkdale, OR (US) 97041

(\*) Notice: Subject to any disclaimer, the term of this patent is extended or adjusted under 35 U.S.C. 154(b) by 0 days.

(21) Appl. No.: 10/817,022

(22) Filed: Apr. 2, 2004

Related U.S. Application Data

(60) Provisional application No. 60/462,381, filed on Apr. 11, 2003.

(51) Int. Cl.
*B60D 1/30* (2006.01)

(52) U.S. Cl. .................... 280/455.1; 280/466.1

(58) Field of Classification Search ............. 280/432, 280/433, 441.2, 446.1, 455.1, 456.1, 457, 280/461.1, 474
See application file for complete search history.

(56) References Cited

U.S. PATENT DOCUMENTS

| | | | | |
|---|---|---|---|---|
| 2,091,668 A * | 8/1937 | Bradford | ............... | 280/455.1 |
| 2,768,837 A * | 10/1956 | Prater | ............... | 280/455.1 |
| 3,955,831 A * | 5/1976 | Whitchurch | ............... | 280/446.1 |
| 4,025,085 A | 5/1977 | Jacobs | | |
| 4,040,507 A * | 8/1977 | Reise | ............... | 280/455.1 |
| 4,133,552 A * | 1/1979 | Sheine | ............... | 280/455.1 |
| 4,306,734 A | 12/1981 | Swanson et al. | | |
| 4,313,616 A * | 2/1982 | Howard | ............... | 280/455.1 |
| 4,662,647 A | 5/1987 | Calvert | | |
| 4,756,543 A * | 7/1988 | Cromnow et al. | ............... | 280/432 |
| 5,184,839 A | 2/1993 | Guedry | | |
| 5,224,727 A * | 7/1993 | Ramskugler | ............... | 280/432 |
| 5,785,341 A * | 7/1998 | Fenton | ............... | 280/441 |
| 5,947,503 A * | 9/1999 | Tompkins | ............... | 280/455.1 |
| 6,422,584 B1 * | 7/2002 | Bittroff et al. | ............... | 280/432 |
| 6,688,631 B1 * | 2/2004 | Andre | ............... | 280/455.1 |
| 2004/0021291 A1 * | 2/2004 | Haug et al. | ............... | 280/455.1 |
| 2004/0232652 A1 * | 11/2004 | Namuduri et al. | ............... | 280/455.1 |

\* cited by examiner

*Primary Examiner*—Kevin Hurley
(74) *Attorney, Agent, or Firm*—Ipsolon llp (57) ABSTRACT

A trailer-stabilizing device that stabilizes movement between a fifth-wheel trailer and the towing vehicle during normal trailering operations and that more effectively distributes the weight of the trailer to the towing vehicle is disclosed. The trailer-stabilizing device extends between the trailer and towing vehicle and is preferably positioned spaced apart from a traditional hitch and tongue connection pivotally securing the towing vehicle to the trailer. Preferably, the fifth-wheel trailer is pivotally secured to a conventional hitch within the bed of the pickup truck, and the stabilizing device is detachably secured to a conventional receiver on the back of the pickup truck.

25 Claims, 6 Drawing Sheets

TRAILER STABILIZATION AND WEIGHT DISTRIBUTION DEVICE

CROSS REFERENCE TO RELATED APPLICATION

This application claims priority to U.S. provisional patent application No. 60/462,381 filed on Apr. 11, 2003.

TECHNICAL FIELD OF THE INVENTION

This invention relates to a device for stabilizing and improving the weight distribution of a trailer being towed by a vehicle.

BACKGROUND OF THE INVENTION

Trailers are towed vehicles that are operably secured to a towing vehicle, usually at a hitch or the like. One type of trailer in common use is known as a travel trailer, which is a towed vehicle usually having many of the conveniences of a home. A particularly popular travel trailer is known as a "fifth-wheel" trailer, which is adapted to be towed by a traditional pick-up truck. Namely, the forward portion of the fifth-wheel trailer is elevated above the bed of the pick-up truck and includes a mounting portion, or tongue, extending from the bottom of the elevated forward portion to a trailer mount, or hitch, secured to the bed of the pick-up truck.

Usually, the distal end of the tongue is usually pivotally secured to the hitch so that the towing vehicle and trailer can pivot with respect to each other about a defined pivot axis. This arrangement allows the towing vehicle and trailer to each have a turn radius that is sufficiently small so that both the towing vehicle and trailer can complete most turns found on conventional roads and the like. Preferably, the tongue is also detachably secured to the hitch so that the trailer may be easily attached and detached from the hitch.

Despite the benefits offered by conventional trailer tongues and hitches, they have several drawbacks. For example, the sole connection between the towing vehicle and trailer is at the pivot. Accordingly, all the pulling and braking forces offered by the towing vehicle are transferred to the trailer at this one location. Similarly, all forces generated by the trailer are transferred to the towing vehicle at this one location. This single point of connection at the pivot places enormous stress on the hitch and tongue, and can cause uneven weight and force distribution between the trailer and towed vehicle during some transient conditions, such as during acceleration and braking of the towing vehicle.

Efforts to improve the weight distribution and stabilization between a tongue & ball-type trailer and its towing vehicle have had limited success. For example, some trailer hitch manufacturers sell a product know as "sway control bars" that extend between the tongue of the trailer and ball on the towing vehicle to dampen side-to-side movement about the pivot. However, these structures also tend to limit the range of motion of the trailer about the pivot, thereby compromising the turn radius of the trailer and towing vehicle. Moreover, such structures are not adaptable for use with fifth-wheel trailers, where the tongue of the trailer connects to a trailer hitch resting in the bed of a pick-up truck-style towing vehicle.

SUMMARY OF THE INVENTION

Accordingly, despite the available structures for stabilizing and distributing the weight between a tongue & ball-type trailer and a towing vehicle, there remains a need for an economical device that stabilizes movement between a fifth-wheel trailer and the towing vehicle during normal trailering operations and that more effectively distributes the weight of the trailer to the towing vehicle. In addition to other benefits that will become apparent in the following disclosure, the present invention fulfills these needs.

The present invention is a trailer-stabilizing device that extends between the fifth-wheel trailer and towing vehicle at a position separate from the connection between the trailer's tongue and towing vehicle's hitch.

In a preferred embodiment, the towing vehicle is a pick-up truck with the tongue of the fifth-wheel trailer engaging the pick-up truck's hitch mounted within the bed of the pick-up truck. The trailer-stabilizing device is detachably secured to a conventional receiver mounted on the rear end of the pick-up truck, and extends from the back of the pick-up truck to operably engage the fifth wheel trailer.

Preferably, the trailer-stabilizing device engages the trailer to apply a downward biasing force during normal, substantially straight, trailering operations, such as found when driving substantially straight along a highway, switching lanes on a highway, accelerating or slowing the trailer and towing vehicle along a substantially flat surface, or the like. This downward biasing force coupled with the tongue of the trailer operably engaging the mount on the pick-up truck allows the stabilizing device to dampen transient movement between the trailer and pick-up truck and more evenly distribute the weight of the trailer to the pick-up truck, thereby preventing lurching and unstable movement of the trailer relative to the pick-up truck. Moreover, the biasing force essentially pretensions the connection between the tongue and hitch, thereby preventing movement between these structures during transient operations contribute to their premature wear and the like.

More preferably, the trailer-stabilizing device also decouples this biasing force from the trailer when maneuverability of the trailer relative to the vehicle must be maximized, such as while turning the pick-up truck and trailer at a street corner, backing up the trailer while turning, and transitioning from a substantially flat surface to a ramp or the like.

DETAILED DESCRIPTION

A trailer-stabilizing device 20 that extends between a fifth-wheel trailer 22 and towing vehicle 24 preferably at a position spaced apart and separate from the connection 26 between the trailer's tongue 28 and towing vehicle's hitch 30 is shown in FIGS. 1-7.

Figure 1:
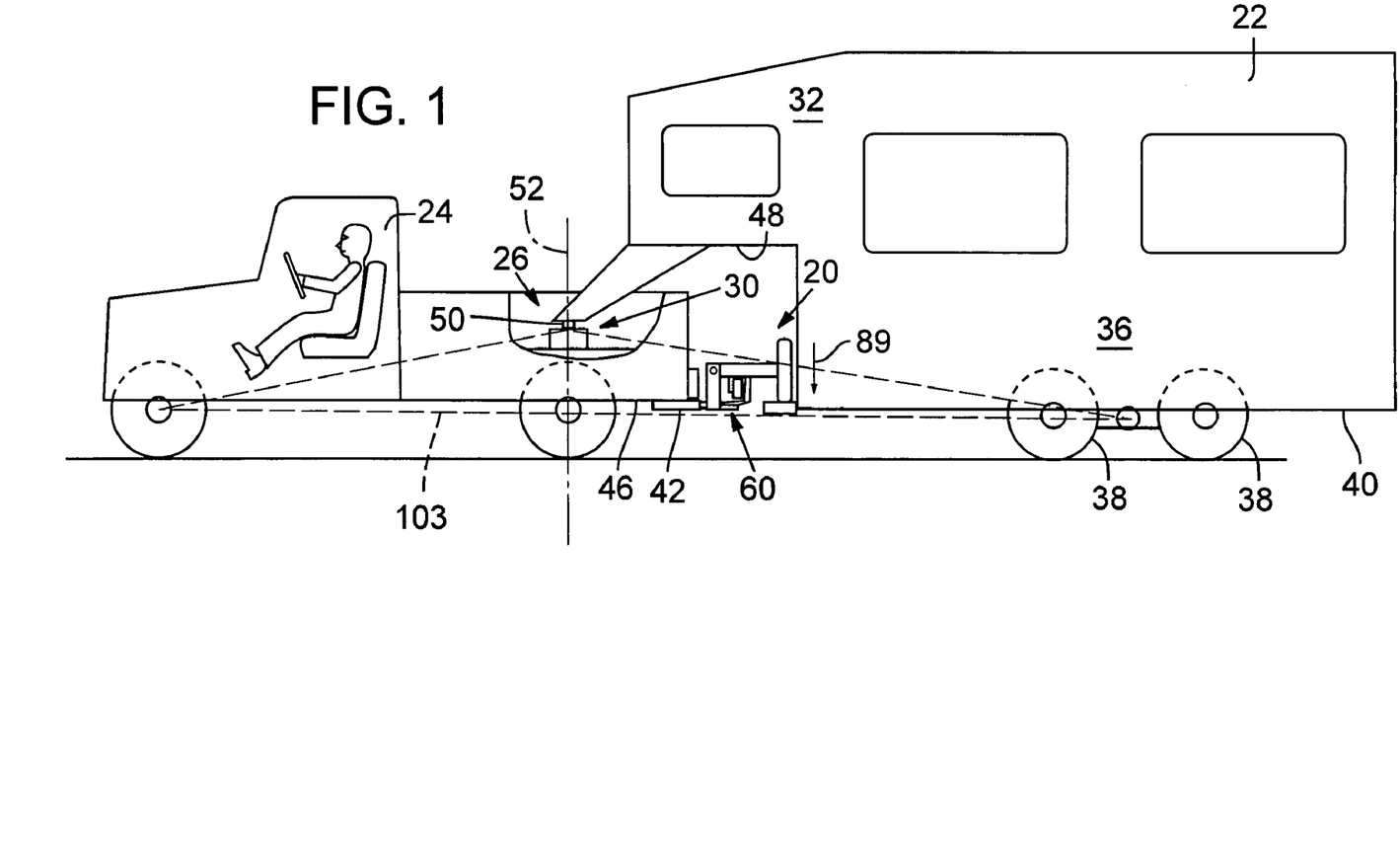
FIG. 1 is a side view of a towing vehicle operably secured to a fifth-wheel trailer at a first hitch and also having a trailer-stabilizing device extending between the towing vehicle and trailer in accordance with an embodiment of the present invention.
Figure 4:
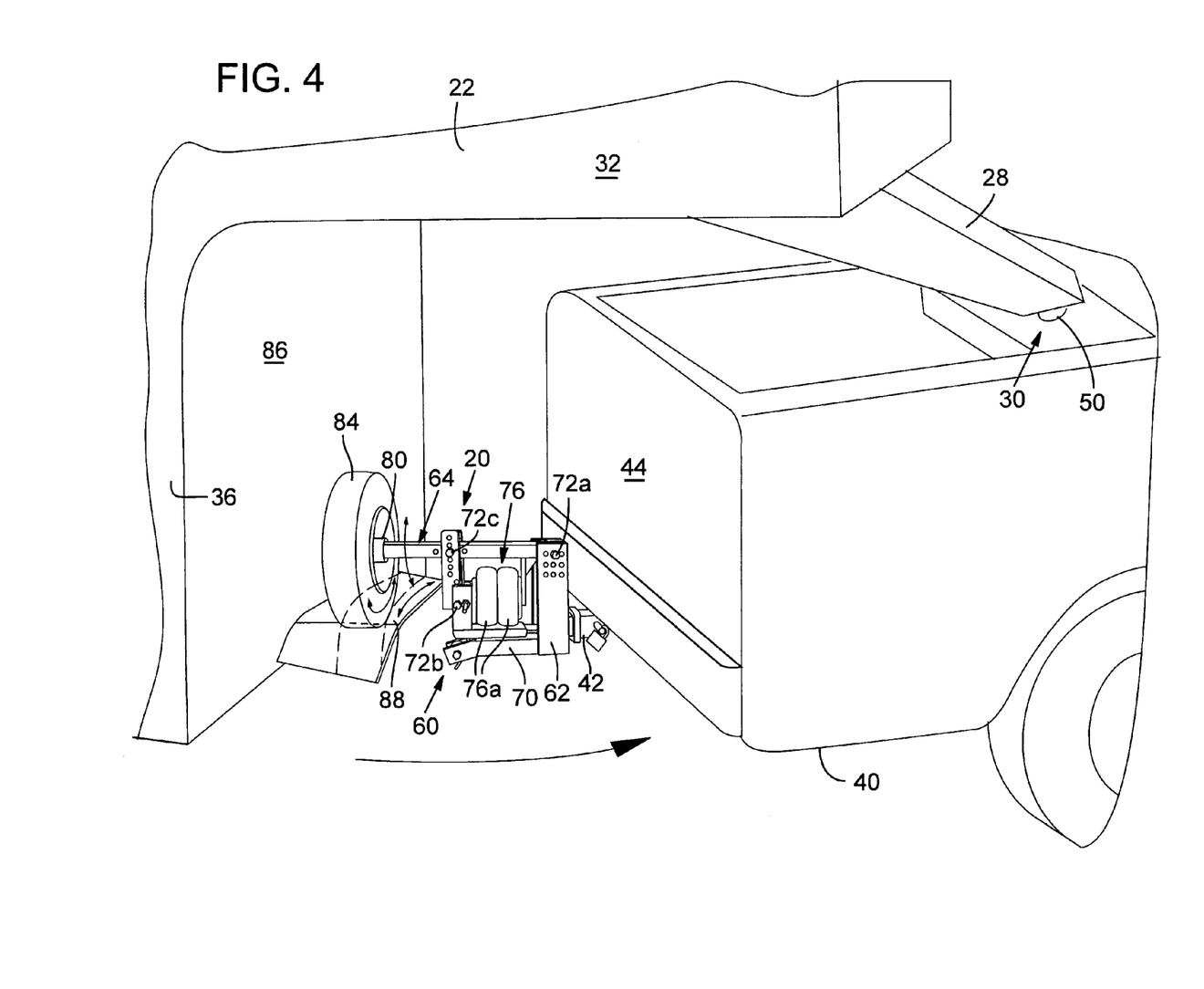
FIG. 4 is a side, isometric view of the trailer-stabilizing device of FIG. 2 showing a possible orientation between a towing vehicle and trailer during a turn.

Preferably, the trailer 22 has a forward, elevated portion 32 and a main cabin 36 as best shown in FIGS. 1 and 4. At least one set of wheels 38 is operably secured to the lower side 40 of the main cabin 36. More preferably, the fifth-wheel trailer includes many of the conveniences of a home therein, such as a bathroom with plumbing, kitchen with working appliances and water, bedroom, living room, heating and electrical systems and the like. Another type of preferable trailer having a front elevated portion and main cabin is commonly used to transport animals therein.

The towing vehicle 24 is preferably a conventional pick-up truck of the like having a trailer hitch 30 operably secured within the bed of the pick-up truck. The towing vehicle includes an engine or the like and related structures for self-propelling and allowing operator steering and control of the towing vehicle. Preferably, a conventional receiver 42 is secured to the rear end 44 of the towing vehicle and positioned toward the lower end 46 of the towing vehicle 24.

The tongue 28 preferably extends from a lower side 48 of the forward, elevated portion 32 of the trailer 22. The distal end 50 of the tongue 28 is detachably and pivotally secured to the hitch 30 so that the towing vehicle 24 and trailer 22 can pivot with respect to each other about a defined pivot axis 52, thereby allowing the towing vehicle 24 to tow the trailer 22. Such tongues 28 and hitches 30 are well known in the art.

Figure 2:
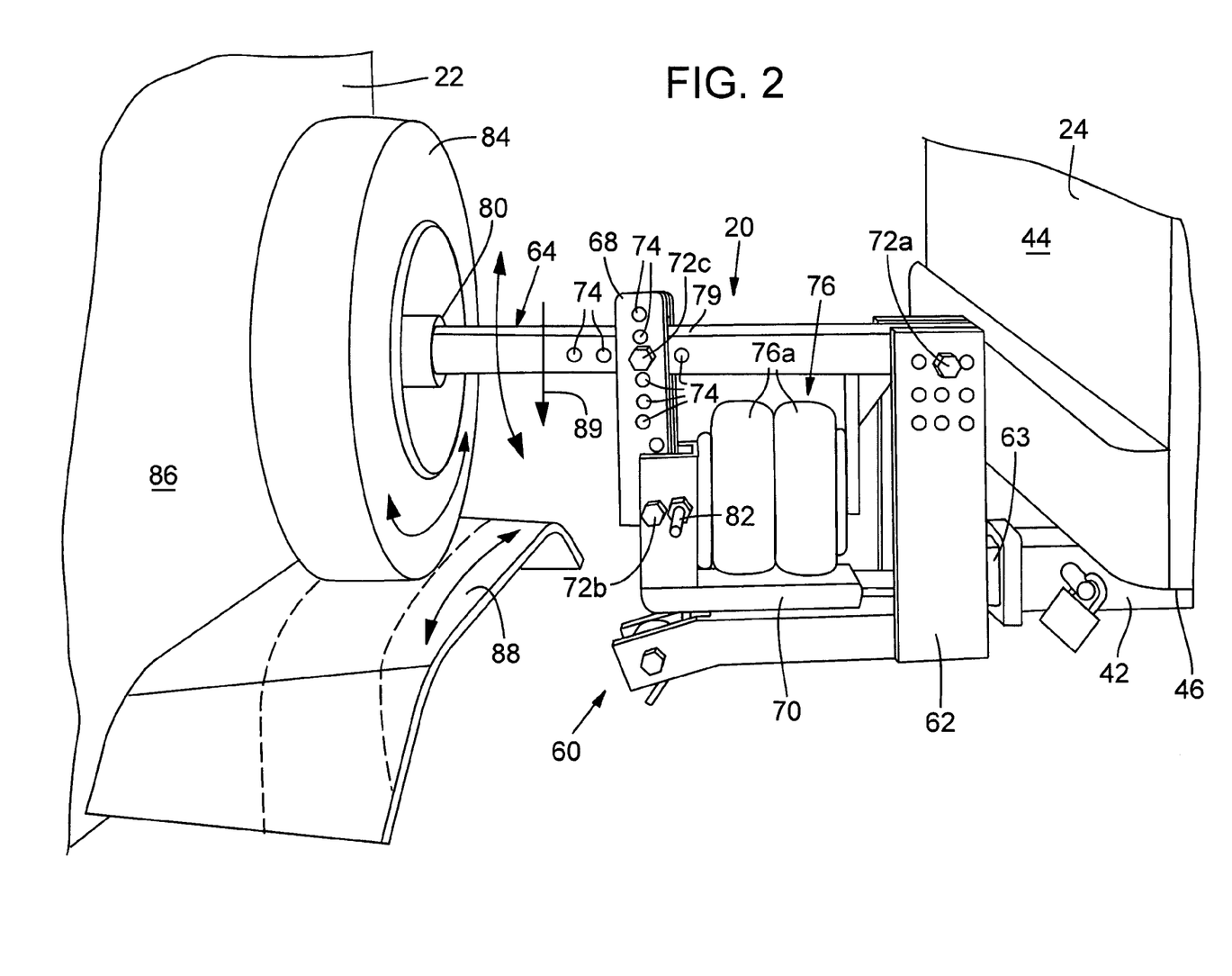
FIG. 2. is a side, isometric view of a possible trailer-stabilizing device in an engaged position and in accordance with an embodiment of the present invention.

As best shown in FIGS. 1-4, the trailer-stabilizing device 20 is operably secured to the towing vehicle 24 and extends to operably engage the trailer 22 to apply a preferably downward biasing force on the main cabin 36 of the trailer. Preferably and as shown in FIGS. 1 and 2, the trailer-stabilizing device 20 engages the trailer 22 to apply the biasing force during normal, substantially straight, trailering operations, such as found when driving substantially straight along a highway, switching lanes on a highway, accelerating or slowing the trailer and towing the trailer 22 along a substantially flat surface, or the like.

This downward biasing force coupled with the tongue 28 of the trailer 22 operably engaging the hitch 30 on the pick-up truck allows the trailer-stabilizing device 20 to dampen transient movement between the trailer 22 and towing vehicle 24 and more evenly distribute the weight between them, thereby preventing lurching and unstable movement of the trailer 22 relative to the towing vehicle 24. Moreover, the biasing force essentially pretensions the connection between the tongue 28 and hitch 30, thereby preventing movement between these structures during transient operations that would otherwise contribute to premature wear or these components and the like.

More preferably and as shown in FIG. 4, the trailer-stabilizing device 20 also decouples this biasing force from the trailer 22 when maneuverability of the trailer 22 relative to the towing vehicle 24 must be maximized, such as while turning the towing vehicle 24 and trailer 22 at a street corner, backing up the trailer 22 while turning, and transitioning from a substantially flat surface to a ramp or the like.

One known structure for providing this type of connection between the towing vehicle 24 and trailer 22 is shown in FIGS. 1-4. The trailer-stabilizing device 20 of this embodiment preferably includes a linkage 60 having a base portion 62 that operably engages the towing vehicle 24, and a trailer-engaging portion 64 that operably engages the trailer 22 and is pivotally secured to the base portion 62. More preferably, the linkage 60 is a four-bar linkage with the base portion 62 forming one link, the trailer-engaging portion 64 forming a second link, a stabilizing link 68 extending therebetween, and a biasing link 70. The base portion 62 is pivotally secured to the trailer-engaging portion 64 at a first pivot 72a. The trailer-engaging portion 64 is also pivotally secured to the stabilizing link 68 at a second pivot 72b, and the biasing link 70 is operably secured to the biasing link 70 as shown.

The base portion 62 preferably has a protrusion 63 that is sized to operably engage a traditional receiver 42 mounted to the rear end 44 of the towing vehicle 24 as shown. Also, the stabilizing link 68 and/or trailer-engaging portion each preferably include a plurality of adjustment holes 74, wherein the height of the distal end of the second link may be adjusted.

Figure 3:
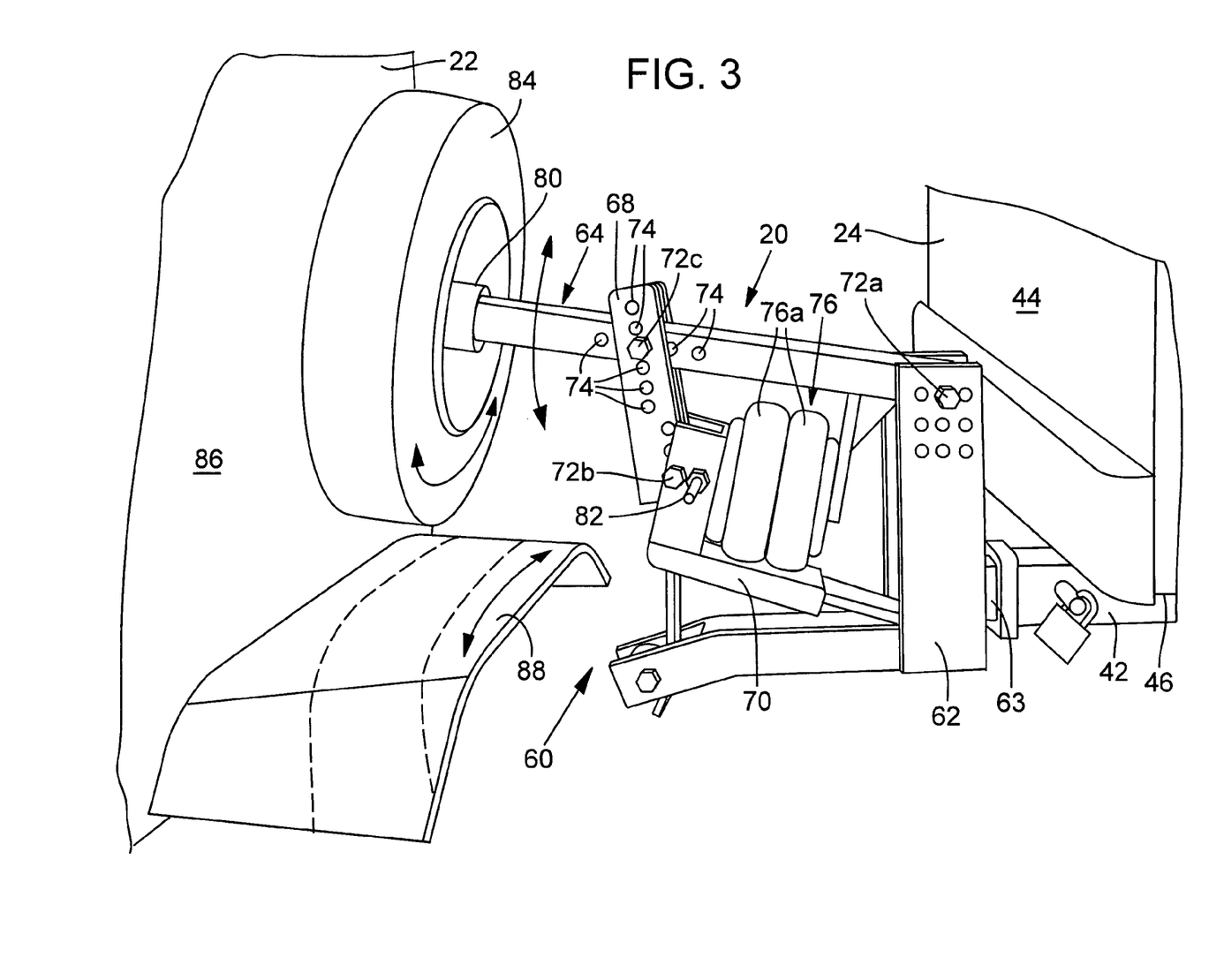
FIG. 3 is a side, isometric view of the trailer-stabilizing device of FIG. 2 showing a possible disengaged position in accordance with an embodiment of the present invention.

A biasing member 76, such as a resilient pneumatic chamber 76a, extends between the trailer-engaging portion 64 and the stabilizing link 68 to urge the distal end 80 of the trailer-engaging portion 64 in a downward direction. However, should an unusually large force be applied to the distal end 80 of the trailer-engaging portion 64, the trailer engaging portion pivots upward about the first pivot 72a as shown in FIG. 3, thereby minimizing the downward force on applied on the distal end 80.

The resilient pneumatic chamber 76a may be filled through a traditional pneumatic valve 82 in fluid communication with the pneumatic chamber 76a. Alternatively, the pneumatic chamber 76a may be operably secured to a remotely-actuated auxiliary pressurization system (not shown). In such case, the actuation control is preferably mounted within the driver compartment of the towing vehicle and within easy reach of the driver. Accordingly, the driver can pressurize the chamber on demand, thereby activating, deactivating, and adjusting the pressure applied by the trailer-stabilizing device 20 as needed.

Preferably, the distal end 80 of the trailer-engaging portion 64 includes a wheel 84 rotatably secured thereto. The front end 86 of the main cabin 36 of the trailer 22 includes a ramp 88 for operably engaging the wheel 84 when the trailer 22 and towing vehicle 24 are substantially longitudinally aligned. Accordingly, the wheel 84 applies a downward biasing force in the direction of arrow 89 (FIG. 2) to the ramp 88, thereby dampening movement of the trailer 22 with respect to the trailering vehicle 24 and effectively distributing the weight of the trailer 22. The ramp 88 is preferably rigidly secured directly to the chassis of the trailer.

Figure 5:
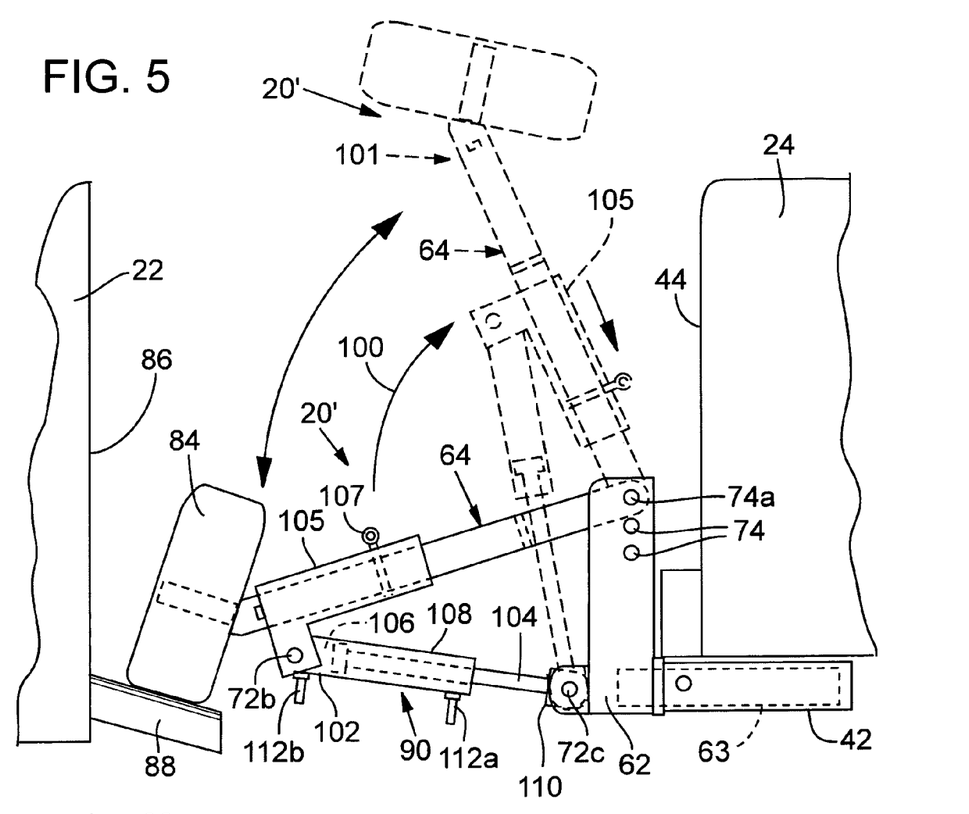
FIG. 5 is a side view of an alternative trailer-stabilizing device in an engaged position in solid lines and a possible stored position in broken lines.
Figure 6:
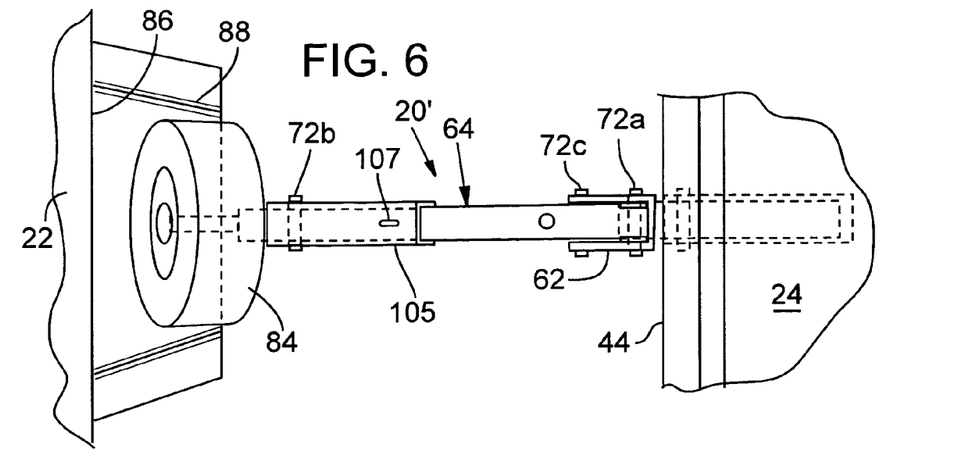
FIG. 6 is a top view of the alternative trailer-stabilizing device of FIG. 5.

Another exemplar structure for the trailer-stabilizing device 20' is shown in FIGS. 5-6. In order to reduce undue repetition, like elements with the previously described embodiment have like element numbers. The trailer-stabilizing device 20' of this embodiment preferably includes a linkage 60' having a base portion 62 that operably engages the towing vehicle 24, and a trailer-engaging portion 64 that operably engages the trailer 22 and is pivotally secured to the base portion 62 at first pivot 72a. Preferably, the base portion including a plurality of vertically aligned and spaced-apart mounting openings for allowing the position of the first pivot 72a to be selected and adjusted by the user simply by mounting the trailer-engaging portion 64 to a different mounting opening on the base portion.

Preferably, a pneumatic dampener 90 is pivotally secured to the base position 62 and trailer-engaging portion 64 at pivots 92b, 92c, respectively. Accordingly, when the pneumatic dampener 90 is deactivated, the wheel 84 mounted to the distal end 80 of the trailer-engaging portion 64 can be pivoted away from the trailer about pivot 72a and in the direction of arrow 100. More preferably, the trailer-engaging portion 64 can be stored in a stored position 101 (shown in broken lines in FIG. 5) adjacent to the towing vehicle 24 when not in use. Preferably, a sliding sleeve 105 is pivotally secured to the pneumatic dampener 90 and slidably received on the trailer-engaging portion 64. Accordingly, the sleeve may be adjustably positioned along the trailer engaging portion, for example, by removing and replacing pin 107 along the trailer-engaging portion 64 as shown in FIG. 5.

The pneumatic dampener 90 includes a base chamber 102 and a piston-type structure 104 slidably secured therein defining a first pneumatic chamber 106 and a second pneumatic chamber 108. The distal end 110 of the piston-type structure 104 is operably secured to the trailer-engaging portion 64 at pivot 72c and the base chamber 102 is operably secured the base portion 62 at pivot 72b. Each pneumatic chamber 106, 108 has a pneumatic port 112a, 112b, respectively, for adding and removing pneumatic load from the respective chambers.

Preferably, each pneumatic port 112a, 112b is in fluid communication with a pneumatic regulator 114 that regulates pneumatic pressure in each chamber 106, 108 based on predefined criteria. More preferably, pneumatic port 112a is in fluid communication with a first manifold 116 and pneumatic port 112b is in fluid communication with a second manifold 118. The first and second manifolds 116, 118, are preferably in fluid communication with each other though the following pneumatic links which are shown schematically in FIG. 7.

Figure 7:
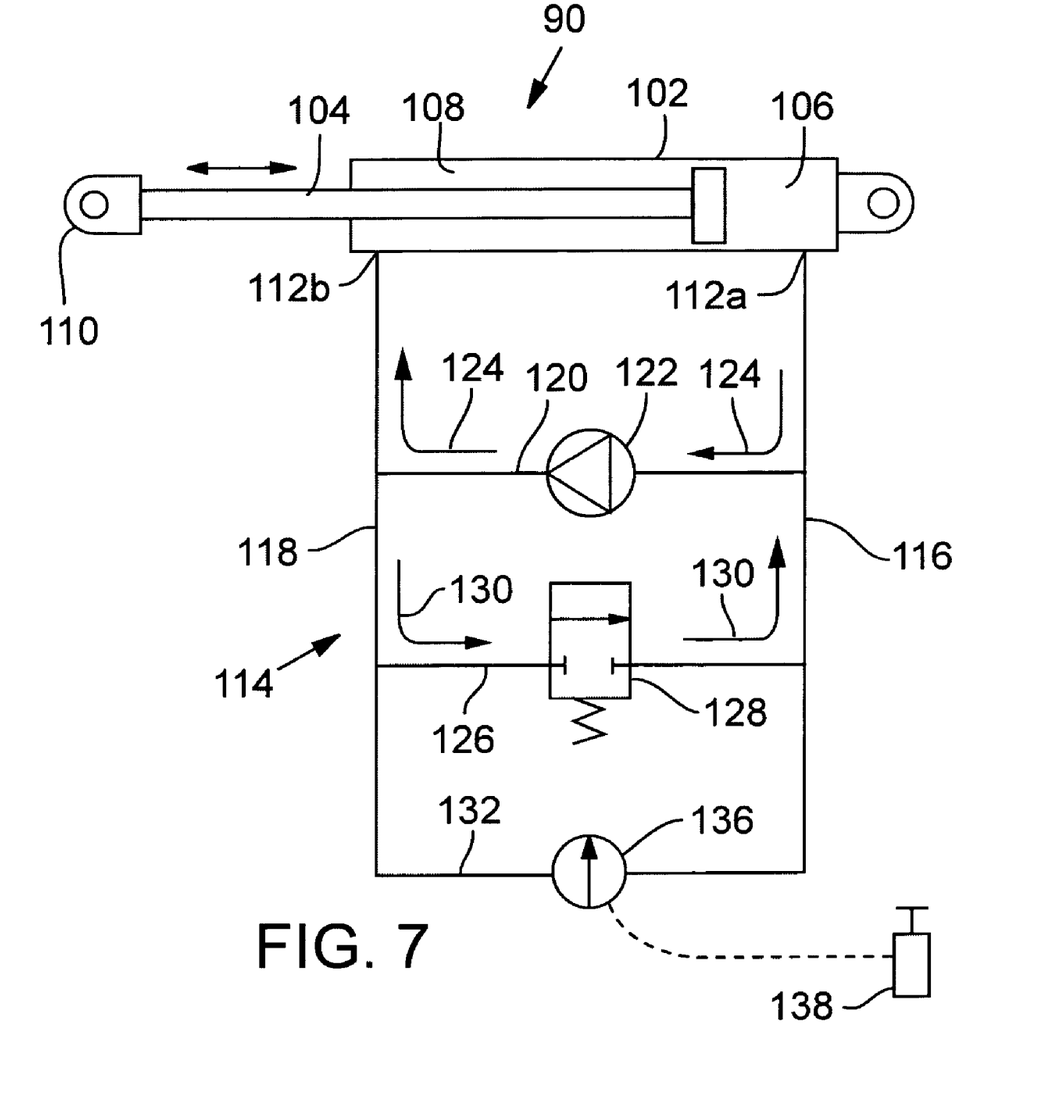
FIG. 7 is an exemplar, schematic diagram of a possible pneumatic system in accordance with an embodiment of the present invention.

1) A first pneumatic link 120 includes a one-way check valve 122 that allows fluid from the first chamber 106 to travel to the second chamber 108 in the direction of arrows 124 until pressure between the two chambers 106, 108 is equalized. Preferably, the wheel 84 operably engages the ramp 88, which is rigidly secured to the trailer 22.
2) A second pneumatic link 126 includes a pressure relief valve 128 that allows fluid from the second chamber 108 to travel to the first chamber 106 in the direction of arrows 130 when pressure in either the first or second chambers 106, 108 exceeds a predetermined limit. This allows the downward force provided by the trailer-stabilizing device 20 to the trailer 22 to be reduced or eliminated, essentially decoupling the trailer-stabilizing device 20 from the trailer 22 when excessive pressure is achieved in the pneumatic chambers 106, 108, for example when the towing vehicle 24 starts up a steep hill while the trailer 22 initially remains essentially flat or the like.
3) A third pneumatic link 132 includes a manually actuated valve 136 that allows the pressures between the first and second chambers 106, 108 to be equalized. This valve 136 is preferably closed during normal operation of the trailer-stabilizing device 20. However, this valve 136 can be opened manually to allow for manual deactivation of the trailer-stabilizing device 20, or to allow an operator to place the trailer-stabilizing device 20 into the previously described stored position. Preferably, the manually-actuated valve 136 includes a remote actuator 138, which is placed within reach of the driver of the towing vehicle when driving the towing vehicle.

The downward force applied in the direction of arrow 89 (FIGS. 1 & 2) by the trailer-stabilizing device to the trailer during steady-state, non-extreme, towing of the trailer by the vehicle serves as a quasi and substantially rigid coupling between the towing vehicle and the trailer. As a result, the rear end of the towing vehicle and the adjacent trailer-stabilizing device engaging portion of the trailer are prevented from moving downward relative to each other. This coupling allows the towing vehicle and trailer to have a combined operating characteristic similar to having a common, substantially rigid truss extending along the entire longitudinal length 103 (FIG. 3) of the combined towing vehicle and trailer. Accordingly, during normal, steady-state operations, the weight of the towing vehicle is more evenly distributed throughout the combined towing vehicle and trailer. Moreover, undesirable tilting and shifting between the towing vehicle and trailer is minimized.

However, and unlike actually having a substantially rigid truss extending between the towing vehicle and trailer, should the need arise to decouple the substantially rigid connection provided by the trailer-stabilizing device, such as excessive downward pressure being applied by the trailer-stabilizing device or the need to pivot the trailer relative to the towing vehicle during a turn or the like, the trailer-stabilizing device includes structures for decoupling the linkage between the towing vehicle and trailer. Accordingly, the towing vehicle and trailer have traditional operating characteristics during these extreme or dynamic operations.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

I claim:

1. A trailer-stabilizing device operably extending between a towing vehicle and a fifth-wheel trailer, said trailer-stabilizing device having:
   a linkage extendable between said towing vehicle and said trailer;
   an engaged position in which said linkage extends between said fifth-wheel trailer and said towing vehicle to apply a dampening force to the fifth-wheel trailer,
   a disengaged position in which the linkage is disconnected between said towing vehicle and said fifth-wheel trailer;
   a regulator for commanding the trailer-stabilizing device between said engaged position and said disengaged position; and,
   wherein said linkage includes,
   an arm pivotally secured to a base;
   a wheel rotatably secured toward a distal end of said arm; and,
   said wheel operably engages a ramp extending from said trailer when said trailer-stabilizing device is in said engaged position.
2. The trailer-stabilizing device of claim 1, wherein said trailer-stabilizing device is in said engaged position when said towing vehicle and said trailer are traveling substantially straight.

3. The trailer-stabilizing device of claim 1, wherein said wheel disengages said ramp when said trailer is in said disengaged position.

4. The trailer-stabilizing device of claim 3, wherein said trailer-stabilizing device is in said disengaged position when said towing vehicle and said trailer are turning.

5. The trailer-stabilizing device of claim 1, wherein said dampening force is provided by a pneumatic chamber operably secured to said trailer-stabilizing device.

6. The trailer-stabilizing device of claim 5, wherein said pneumatic chamber is substantially flexible.

7. The trailer-stabilizing device of claim 5, wherein said pneumatic chamber is a pneumatic cylinder.

8. The trailer-stabilizing device of claim 3, wherein said regulator includes a pressure relief valve that activates when a predefined upper pressure is achieved in the pneumatic chamber.

9. The trailer-stabilizing device of claim 8, wherein said regulator includes a manually actuated pressure relief valve.

10. The trailer-stabilizing device of claim 9, wherein:
said manually actuated pressure relief valve has a control handle;
and said towing vehicle has a driver's compartment;
and said control handle is positioned within said driver's compartment so that a driver of the vehicle may activate the control handle from within said driver's compartment.

11. A trailer-stabilizing device operably extending between a pick-up truck and a fifth-wheel trailer, said trailer-stabilizing device having:
a linkage extendable between said pick-up truck and said trailer;
an engaged position in which said linkage extends between said fifth-wheel trailer and said pick-up truck to apply a dampening force to the fifth-wheel trailer,
a disengaged position in which the linkage is disconnected between said pickup-up truck and said fifth-wheel trailer;
a regulator for commanding the trailer-stabilizing device between said engaged position and said disengaged position; and,
wherein said linkage has a stored position wherein said trailer-stabilizing device does not extend between said towing vehicle and said trailer; and,
said linkage is pivotally secured to said towing vehicle and pivoted upward away from said trailer in said stored position.

12. The trailer-stabilizing device of claim 11, wherein said linkage may be secured in said stored position.

13. A trailer-stabilizing device extending between a pickup truck and a fifth-wheel trailer, said pick-up truck having a rear end with a receiver secured thereto, said trailer-stabilizing device detachably secured to said receiver and having:
a dampener operably connected to said pick-up truck and said fifth-wheel trailer, said dampener having an engaged position in which said dampener applies a dampening force to the fifth wheel trailer,
said dampener having a disengaged position in which the dampening force is not substantially applied to the fifth-wheel trailer; and,
a regulator for commanding the dampener between said engaged position and said disengaged position.

14. The trailer-stabilizing device of claim 13, wherein said trailer-stabilizing device includes a linkage extending between said pick-up truck and said fifth-wheel trailer.

15. The trailer-stabilizing device of claim 14, wherein said linkage is substantially a four bar linkage.

16. A trailer-stabilizing device extending between a pick-up truck and a fifth-wheel trailer, said trailer-stabilizing device having:
an engaged position in which said trailer-stabilizing device operably engages said fifth-wheel trailer and said pick-up truck to apply a dampening force to the trailer,
a disengaged position in which the dampening force is not substantially applied to the fifth-wheel trailer;
a regulator for commanding the trailer-stabilizing device between said engaged position and said disengaged position;
said trailer-stabilizing device secured between the pick-up truck and the fifth-wheel trailer at a position spaced apart from a hitch connecting the towing vehicle to the trailer; and,
wherein said pick-up truck has a rear end with a receiver secured thereto, and said trailer-stabilizing device is detachably secured to said receiver.

17. The trailer-stabilizing device of claim 16, wherein said trailer-stabilizing device includes a linkage extending between said pick-up truck and said trailer.

18. The trailer-stabilizing device of claim 17, wherein said linkage is substantially a four bar linkage.

19. A trailer-stabilizing device extending between a pick-up truck and a fifth-wheel trailer, said trailer-stabilizing device having:
an engaged position in which said trailer-stabilizing device operably engages said fifth-wheel trailer and said pick-up truck to apply a dampening force to the trailer,
a disengaged position in which the dampening force is not substantially applied to the fifth-wheel trailer; and,
a regulator for commanding the trailer-stabilizing device between said engaged position and said disengaged position;
wherein the trailer has a main cabin, and said dampening force is a substantially downward force applied by the trailer-stabilizing device to the main cabin; and,
wherein said pick-up truck has a rear end with a receiver secured thereto, and said trailer-stabilizing device is detachably secured to said receiver.

20. The trailer-stabilizing device of claim 19, wherein said trailer-stabilizing device includes a linkage extending between said pick-up truck and said trailer.

21. A trailer-stabilizing device extending between a pick-up truck and a fifth-wheel trailer, said trailer-stabilizing device having:
an engaged position in which said trailer-stabilizing device operably engages said fifth-wheel trailer and said pick-up truck to apply a dampening force to the trailer,
a disengaged position in which the dampening force is not substantially applied to the fifth-wheel trailer; and,
a regulator for commanding the trailer-stabilizing device between said engaged position and said disengaged position;
wherein the trailer has a main cabin, and said dampening force is a substantially downward force applied by the trailer-stabilizing device to the main cabin; and,
wherein said linkage is substantially a four bar linkage.

22. The trailer-stabilizing device of claim 21, wherein said trailer-stabilizing device is in said engaged position when said towing vehicle and said trailer are traveling substantially straight.

23. The trailer-stabilizing device of claim 21, wherein said trailer-stabilizing stabilizing device is in said disengaged position when said towing vehicle and said trailer are turning.

24. The trailer-stabilizing device of claim 21, wherein said trailer-stabilizing device is in said engaged position when said towing vehicle and said trailer are traveling substantially straight.

25. The trailer-stabilizing device of claim 21, wherein said trailer-stabilizing device is in said disengaged position when said towing vehicle and said trailer are turning.

* * * * *